(12) United States Patent
Li et al.

(10) Patent No.: US 6,459,814 B1
(45) Date of Patent: Oct. 1, 2002

(54) METHOD AND APPARATUS FOR GENERIC SCALABLE SHAPE CODING BY DERIVING SHAPE INFORMATION FOR CHROMINANCE COMPONENTS FROM LUMINANCE COMPONENT

(75) Inventors: Shipeng Li, Princeton; Hung-Ju Lee, West Windsor; Iraj Sodagar, North Brunswick, all of NJ (US)

(73) Assignees: Sarnoff Corporation, Princeton, NJ (US); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/391,058

(22) Filed: Sep. 7, 1999

Related U.S. Application Data

(60) Provisional application No. 60/099,379, filed on Sep. 8, 1998.

(51) Int. Cl.[7] .............................. G06K 9/36; H04N 7/12
(52) U.S. Cl. .................. 382/240; 382/243; 375/240.11; 375/240.21; 348/396.1
(58) Field of Search ........................... 348/391.1, 392.1, 348/396.1, 424.1, 398.1; 382/243, 240, 166, 248; 375/240.11, 240.08, 240.09, 240.19; 386/112

(56) References Cited

U.S. PATENT DOCUMENTS

| | | | |
|---|---|---|---|
| 5,623,310 A | 4/1997 | Kim | 348/394 |
| 5,822,460 A | * 10/1998 | Kim | 382/243 |
| 5,982,434 A | * 11/1999 | Tong et al. | 348/398 |
| 6,351,492 B1 | * 2/2002 | Kim | 375/240.08 |

FOREIGN PATENT DOCUMENTS

| | | |
|---|---|---|
| EP | 0 261 561 A1 | 3/1988 |
| EP | 0 909 096 A1 | 4/1999 |

OTHER PUBLICATIONS

Xiong et al. "Multiresolutional encoding and decoding in embedded image and video coders". Proceedings of the 1998 IEEE International Conference on Acoustics, Speech and Signal Processing. May 12–15, 1998. vol. 6, p. 3709–3712.*

Martucci et al. "A zerotree wavelet video coder". IEEE Transactions on Circuits and Systems for Video Technology. Feb. 1997. vol. 7, Iss. 1, p. 109–118.*

Ostermann et al. "Coding of arbitrarily shaped video objects in MPEG–4". Proceedings, International Conference on Image Processing. Oct. 26–29, 1997 vol. 1, p. 496–499.*

Haridasan et al. "Scalable coding of video objects". Proceedings of the 1998 IEEE International Symposium on Circuits and Systems. May 31–Jun. 3, 1998. vol. 4, p. 289–292.*

* cited by examiner

*Primary Examiner*—Amelia M. Au
*Assistant Examiner*—Colin LaRose
(74) *Attorney, Agent, or Firm*—William J. Burke

(57) ABSTRACT

A generic spatially scalable shape encoding apparatus and method for deriving shape information for chrominance components from luminance component. The present generic spatially-scalable shape encoding applies a series of subband (e.g., wavelet) filters to obtain N-levels of wavelet decomposition for the texture information of both luminance and chrominance components. The application of the corresponding subsampling filters of said subband filters is applied in a manner such that the shape of the chrominance can be derived from the shape of the luminance at the same spatial layer.

20 Claims, 6 Drawing Sheets

METHOD AND APPARATUS FOR GENERIC SCALABLE SHAPE CODING BY DERIVING SHAPE INFORMATION FOR CHROMINANCE COMPONENTS FROM LUMINANCE COMPONENT

This application claims the benefit of U.S. Provisional Application No. 60/099,379 filed Sep. 8, 1998, which is herein incorporated by reference.

The invention relates to an apparatus and a concomitant method for shape or object mask coding. More particularly, the invention relates to a method for increasing the efficiency of scalable shape coding by deriving shape information for chrominance components from luminance component.

BACKGROUND OF THE INVENTION

Shape or object mask encoding (also known as object-oriented image and video coding) has gained acceptance and is presently being promoted to various multimedia standards, e.g., the MPEG-4 (Moving Picture Experts Group) international standard. However, unlike traditional frame encoding methods, each frame or picture is considered as consisting of one or more flexible objects (objects having arbitrary shapes), that may undergo changes such as translations, rotations, scaling, brightness and color variations and the like. Using shape or object mask encoding, functionalities are not only provided at the frame level, but also at the object level.

One functionality is scalability, i.e., providing an image at different spatial resolutions. In general, shape encoding starts by segmenting an image frame into a plurality of objects or video object planes (VOPs), e.g., a speaker in an image is one object and the background is a second object. The resulting "shape information" can be represented as a "binary mask". The binary shape information provides object mask with only two values: transparent or opaque (where transparent means the corresponding pixel is outside of an object and opaque means the corresponding pixel is within the object). A mask can be broadly defined as the information that defines the shape of an object or pixels associated with an object. More specifically, the shape information or object mask is used to indicate the arbitrary shape of an image or video object and the region in which the texture of this object needs to be coded. Since the object mask is tracked and encoded along with the texture information into the bitstream, it is possible to provide various functionalities based on object. An example of a novel shape or object mask coding is disclosed in the patent application entitled "Method And Apparatus For Generic Scalable Shape Coding" filed on May 17, 1999 with Ser. No. 09/312,797, which is commonly owned by the assignee and is incorporated herein by reference.

Additionally, subband based (e.g., wavelet based coding as discussed below) coding is also supported by the MPEG-4 standard. One of the advantages of wavelet based coding scheme is that it can provide flexible spatial scalability. Thus, the coding standard should support both spatial scalability of texture coding and spatial scalability of shape coding.

Unfortunately, due to the nature of shape-adaptive wavelet transform, the wavelet transforms of texture information within a region are based on the shape information of that region. Thus, in order to perfectly reconstruct the texture information at the decoder end, the shape of the region to be used in the decoder end for inverse wavelet transform must be exactly the same as the shape used in the encoder end for wavelet transform. This is true for each spatial layer for the luminance and chrominance components. Unfortunately, this leads to the requirement that both luminance and chrominance shape information are to be encoded into the bitstream, thereby reducing coding efficiency.

It should be noted that if no spatial scalability of shape coding is required at the decoder end, then one can always start from the full resolution of the shape information for luminance and then derive from that the exact shape for chrominance at whatever spatial level according to the same decomposition order of the encoder. However, when the scalability of shape coding is required, it is desirable to be able to derive the exact shape of the chrominance information from the shape of the luminance at the same spatial level, without having to start from the full resolution of the luminance shape information, which may not be available or may not be computationally practical for a particular application.

Therefore, a need exists in the art for a generic spatially-scalable shape encoding method and apparatus that is capable of deriving the exact shape of the chrominance components from the shape of the luminance component for each spatial layer.

SUMMARY OF THE INVENTION

In the present invention, an embodiment of a generic spatially-scalable shape encoding apparatus and concomitant method for deriving the exact shape of the chrominance components from the shape of the luminance component for each spatial layer, is disclosed. The present generic spatially-scalable shape encoding applies a series of subband (e.g., wavelet) filters, T1, T2, ... TN, to obtain N-levels of wavelet decomposition for both texture and shape information of both luminance and chrominance components.

More specifically, a series of subband filters, T1, T2, ... TN, are applied to an input image to obtain N-levels of subband decomposition for both texture and shape information of the luminance component. It should be noted that subband filtering comprises two distinct processing steps: spatial filtering and subsampling. In the preferred embodiment, the corresponding subsampling function (T1) of said subband filter T1 is applied to the full resolution luminance shape information or mask to obtain a full resolution chrominance shape information. In turn, the corresponding series of subsampling filters ((T2), ... (TN)) can be applied to the full resolution chrominance shape information to obtain additional levels of chrominance shape information. Next, the corresponding series of subband filters, T2, ... TN, and said plurality of levels of chrominance shape information are applied to the full resolution chrominance texture information to obtain a plurality of levels of chrominance texture information.

Finally, the plurality of levels of resolution of luminance texture and shape information are encoded into the bitstream. However, only the plurality of levels of resolution of chrominance texture information are encoded into the bitstream. Namely, coding efficiency is enhanced by not having to encode the plurality of levels of resolution of chrominance shape information into the bitstream, while still providing the desirable feature of scalability.

Additionally, the present invention also discloses a novel method of interpolating a missing chrominance component corresponding to a luminance pixel within an object. Namely, the missing chrominance component is interpolated by taking the average of its three neighboring values in the chrominance plane.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Shape coding is an important part of object-oriented image and video coding. The shape information or object mask is used to indicate the arbitrary shape of an image or video object and the region in which the texture of this object needs to be coded.

Figure 1:
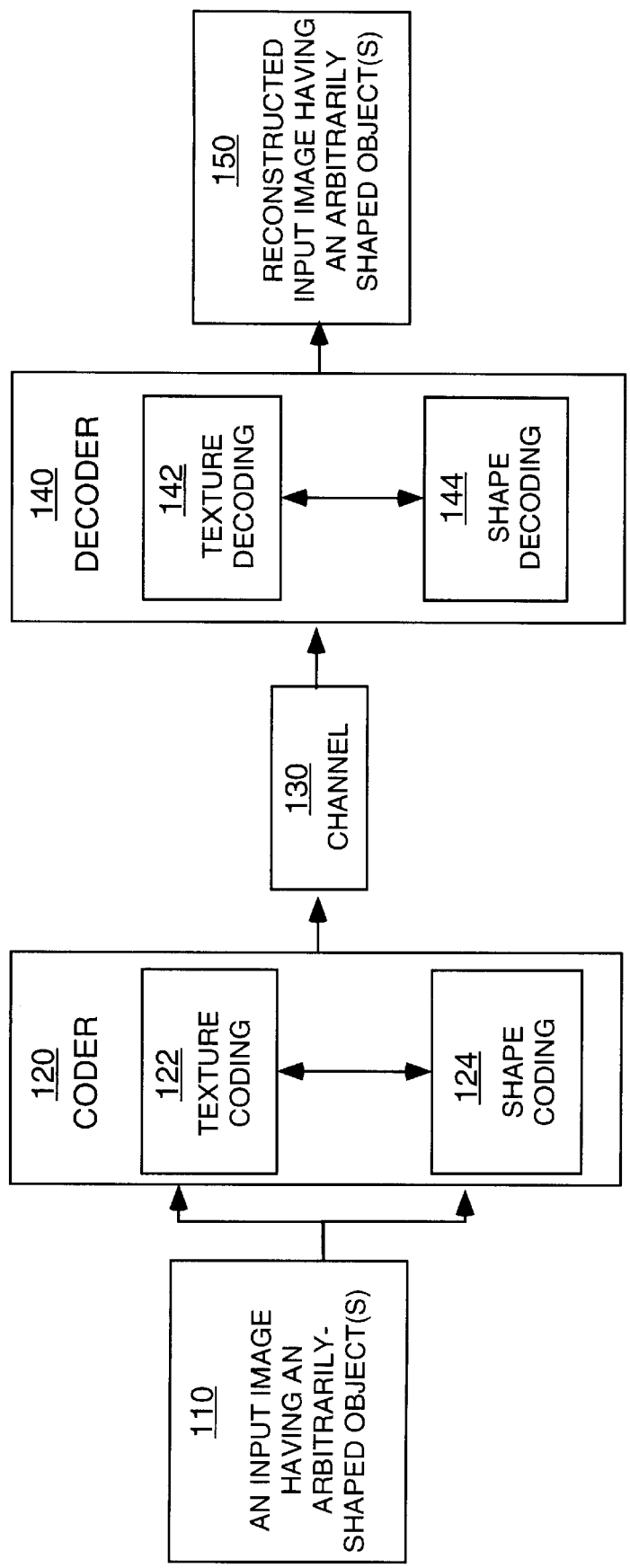
FIG. 1 illustrates a block diagram of an object-oriented coding and decoding system of the present invention.

FIG. 1 provides a block diagram of an object-oriented coding system 100 of the present. An input image or frame 110 having one or more arbitrarily-shaped objects is applied to a coder 120 for encoding. The coder 120 is designed to apply texture 122 and shape 124 coding to the input image to generate an encoded bitstream representative of said input image. The bitstream is then forwarded to a decoder 140 via a communication channel 130. Complementary to the coder 120, the decoder 140 applies texture 142 and shape 144 decoding to decode the bitstream, thereby producing a reconstructed input image 150 having the one or more arbitrarily-shaped objects. It should be noted that due to the scalability of the encoded bitstream, the reconstructed input image 150 can be a scaled version of the original input image.

Figure 2:
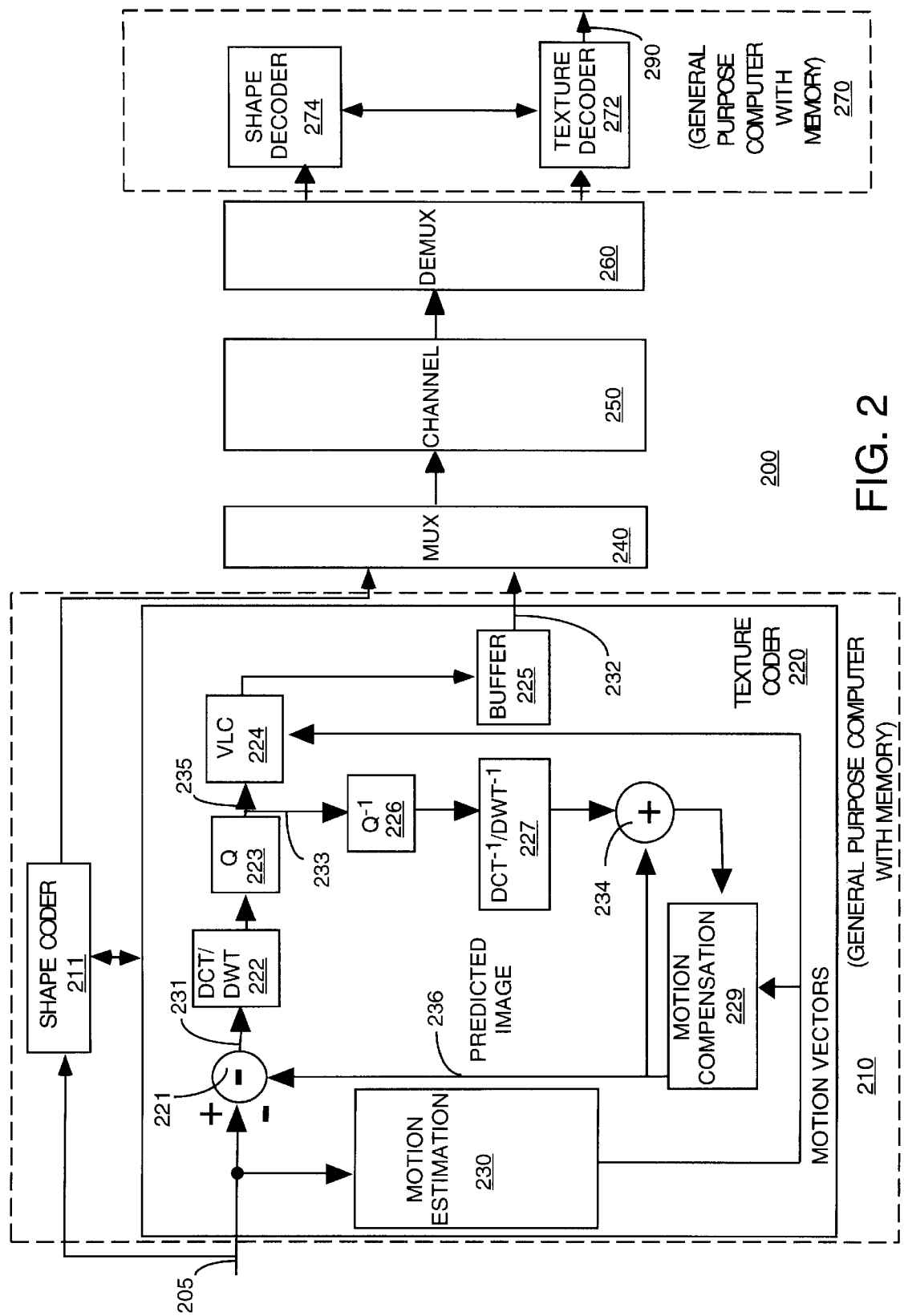
FIG. 2 illustrates a block diagram of a detailed object-oriented coding and decoding system of FIG. 1.

FIG. 2 illustrates a detailed coding and decoding system 200 of the present invention. The present coding and decoding system 200 comprises an encoder 210 and a decoder 270. In the preferred embodiment, the encoder 210 comprises a shape coder 211 and a texture coder 220. The shape coder 211 is tasked with generating and coding the shape information, e.g., object mask, whereas the texture coder 220 is tasked with the encoding of the luminance and chrominance variations of the regions bounded by the object mask.

More specifically, input image signal is received on path 205 by both coders 211 and 220. The input image signal can be an input video image (image sequence) which is digitized and represented as a luminance and two color difference signals.

The shape coder 211 operates to extract shape information from the input image, e.g., detecting one or more objects, generating object masks, decomposing object masks, and/or coding of object masks. As such, the present generic spatially-scalable shape coding method is implemented in shape coder 211. It should be noted that the input image signal may already contain "object based" information, such that one or more shape processing steps can be omitted. For example, if the input image signal contains VOP information, segmentation processing can be omitted since the objects are already defined for the shape coder 211.

The texture coder 220 may comprise a motion estimation module 230, a motion compensation module 229, a transform module (discrete cosine transform (DCT) or discrete wavelet transform (DWT))222, a quantization (Q) module 223, an entropy coding module 224, e.g., variable length coding (VLC) module, a buffer 225, an inverse quantization ($Q^{-1}$) module 226, an inverse transform ($DCT^{-1}$ or $DWT^{-1}$) transform module 227, a subtractor 221 and a summer 234. It should be noted that the texture coder 220 is illustrated as an example and the present invention is not limited to any particular texture coder.

In operation, the input image signal is received into motion estimation module 230 for estimating motion vectors. In fact, the motion estimation module 230 may utilize the shape information received from the shape coder in its motion estimation processing. The motion vectors are received by the motion compensation module 229 for generating a prediction that uses motion vectors to provide offsets into the past and/or future reference frames containing previously decoded sample values that are used to form the prediction error.

A motion compensated prediction (predicted image) is generated on path 236 and is subtracted via subtractor 221 from the input image on path 205 to form an error signal or predictive residual signal on path 231. A spatial transform module 222 is then applied to generate transform coefficients that can be manipulated for the purpose of removing spatial redundancy.

The resulting transform coefficients are received by quantization module 223 where the transform coefficients are quantized. Next, the resulting quantized coefficients are received by an entropy coding module such as a variable length coding (VLC) module 224 via signal connection 235, where the quantized coefficients are entropy coded and are received into a "First In-First Out" (FIFO) buffer 225 for transmission or storage.

Additionally, the resulting quantized coefficients from the quantization module 223 are also received by the inverse quantization module 226 via signal connection 233. The resulting dequantized coefficients are passed to the inverse transform module 227 where inverse transform is applied to produce the decoded error signal. This error signal is added back to the prediction signal from the motion compensation module via summer 234 to produce a decoded reference picture (reconstructed image).

The encoded bitstreams from coders 211 and 220 are then received and multiplexed by the transport stream multiplexer 240 to produce a transport stream. The transport stream is transmitted over a communication channel 250, which may further incorporate separate channel specific encoder and decoder (not shown). Next, the transport stream is demultiplexed and decoded by a transport stream demultiplexor 260, where the elementary streams serve as inputs to video decoder 270, whose output is a decoded video signal on path 290. It should be noted that although the present invention is described below with respect to an encoding method and apparatus, a corresponding and complementary decoding process is performed via a complementary set of a shape decoder 274 and a texture decoder 272.

Furthermore, FIG. 2 illustrates the present encoder 210 and decoder 270 as capable of being implemented within a general purpose computer having various input/output devices, e.g., a keyboard, a mouse, an audio recorder, a camera, a camcorder, a video monitor, any number of imaging devices or storage devices, including but not limited to, a tape drive, a floppy drive, a hard disk drive or a compact disk drive (not shown). Namely, the general purpose computer may comprise a central processing unit (CPU) (not shown), a memory (not shown) and the encoder 210 for encoding an image, video and/or audio signal in accordance with the methods described below.

The encoder 210 can be a physical device, which is coupled to the CPU through a communication channel. Alternatively, the encoder 210 can be represented by a software application (or a combination of software and hardware, e.g., using application specific integrated circuits (ASIC)), where the software is loaded from a storage medium, (e.g., a magnetic or optical drive or diskette) and operated by the CPU in the memory of the computer. As such, the encoder itself and the methods executed by the encoder of the present invention can be stored on a computer readable medium.

Similarly, the decoder 270 can also be a physical device, which is coupled to the CPU through a communication channel. Alternatively, the decoder 270 can be represented by a software application (or a combination of software and hardware, e.g., using application specific integrated circuits (ASIC)), where the software is loaded from a storage medium, (e.g., a magnetic or optical drive or diskette) and operated by the CPU in the memory of the computer. As such, the decoder itself and the methods executed by the decoder of the present invention can also be stored on a computer readable medium.

Specifically, the present invention discloses a method for increasing the efficiency of scalable shape coding by deriving shape information for chrominance components from luminance component. The present invention addresses the criticality where there is a "mismatch" between the chrominance shape and the luminance shape. Such mismatch affects the scalability of the resulting bitstream.

To illustrate, if the chrominance components have the same spatial resolution as the luminance component, the mismatch problem is solved since the shape or object mask of the chrominance components is the same as that of luminance for all spatial layers. However, when the chrominance components do not have the same resolution as luminance (usually chrominance components have lower resolution than luminance, for example, YUV 420, YUV 422 format), a mismatch may occur. Namely, since the wavelet filter that is used for decomposing the texture information and the filter that is used to subsample the luminance shape into the chrominance shape may be different from those filters employed to decompose the chrominance texture information, a mismatch between the resulting chrominance shape derived from higher chrominance spatial layers (the correct shape, but may not be available because of salability of shape coding) and the chrominance shape derived from the luminance shape at the same spatial layer may occur.

In the context of MPEG, at present, there are two common types of wavelet filter that can be used in shape-adaptive wavelet transform: even symmetric filter and odd symmetric filter for texture decomposition, whereas a number of different filters are available for shape decomposition between spatial layers. Namely, for the odd symmetric filter case, the 1-D decomposition begins by subsampling every even position mask value into low subband and every odd position mask value into high subband. If there is an isolated pixel at the odd position, then the mask values at the corresponding position at low subband and high subband are swapped. In contrast, for the even symmetric filter case, the 1-D decomposition begins by subsampling every even position mask value into low subband and every odd position mask value into high subband. If a segment starts at odd position, then the mask values at the start position at low subband and high subband are swapped.

However, since the wavelet decomposition filters from a higher spatial layer to a lower spatial layer is essentially a non-linear subsampling process, the chrominance shape derived from a luminance shape will not match a chrominance shape derived from higher chrominance spatial layers. Since, a new syntax was added to the MPEG-4 visual texture coding to allow different filters for different spatial layers, such increase in filtering choices would increase the number of cases of mismatched shapes if the scalability of shape coding is required.

In contrast, the present invention as disclosed below will address this mismatch problem, while requiring no modification in the existing MPEG-4 syntax, but will enable both shape scalability and texture scalability in object-oriented coding. The reader should simultaneously consult FIGS. 3–5 while reading the following description of the invention.

Figure 3:
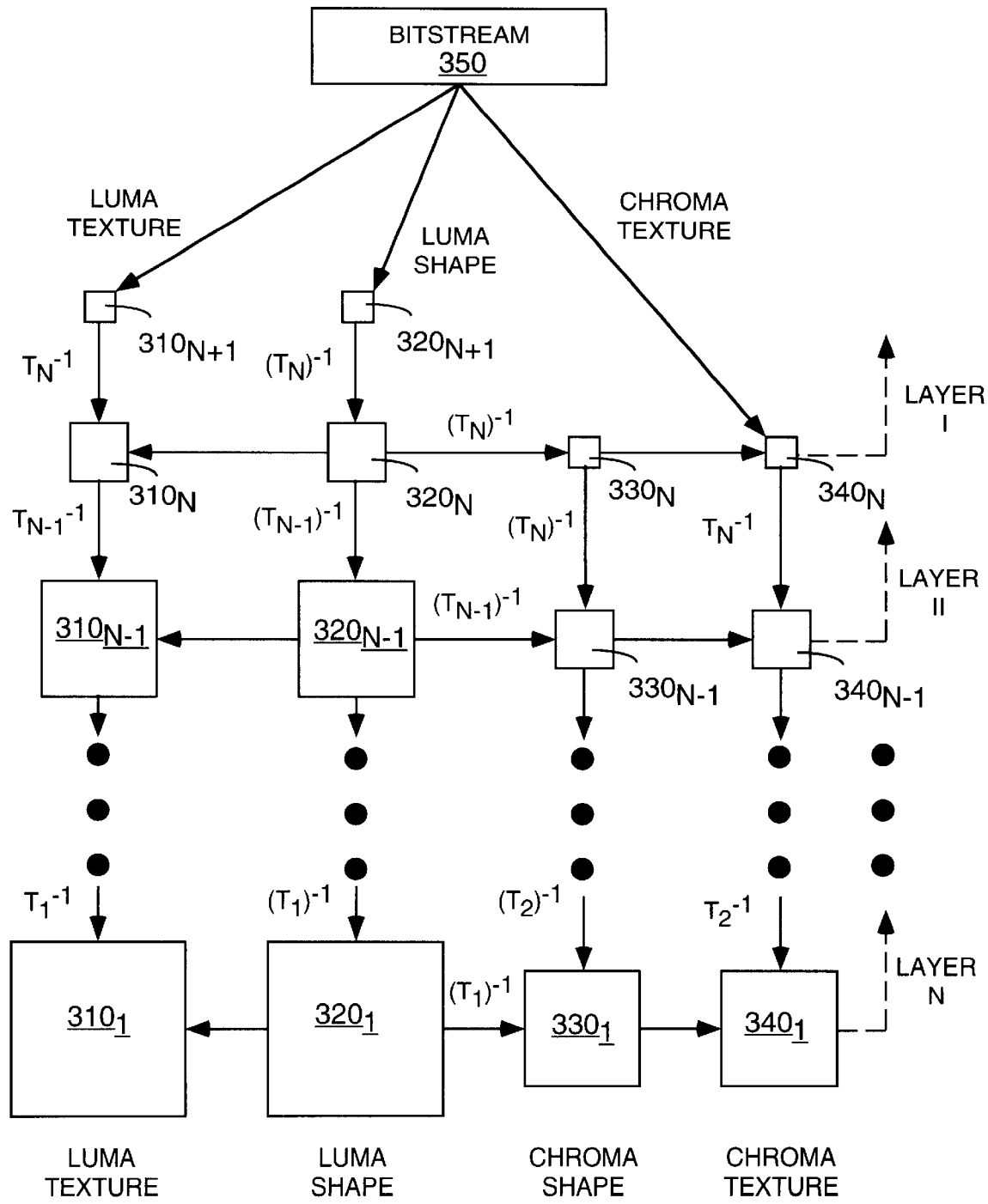
FIG. 3 illustrates a block diagram of the scalabilities of shape coding and texture coding for luminance and chrominance in arbitrarily shaped image and video coding.
Figure 4:
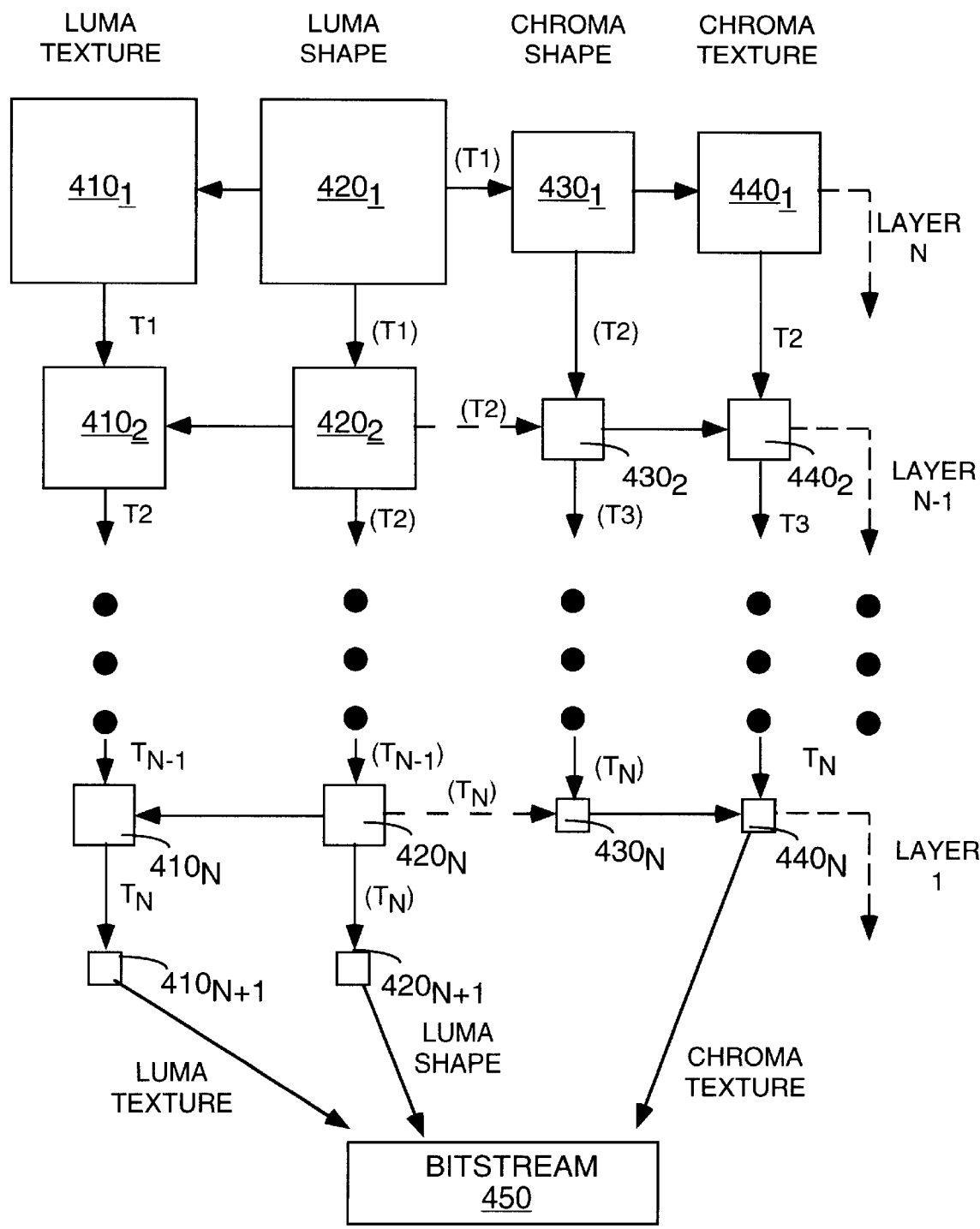
FIG. 4 illustrates a block diagram of the wavelet decomposition structure of the present invention in providing scalabilities of shape coding and texture coding for luminance and chrominance in arbitrarily shaped image and video coding.
Figure 5:
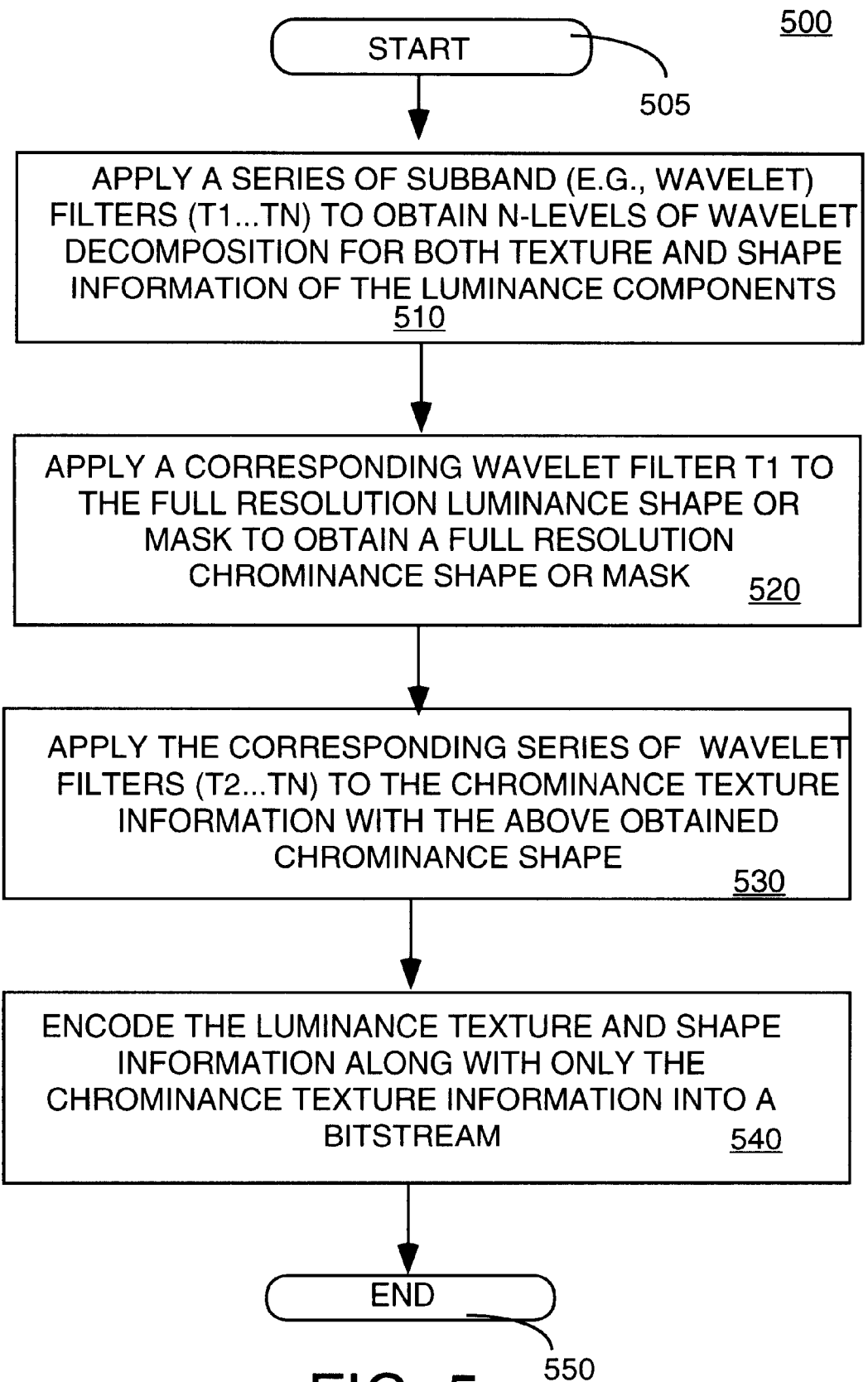
FIG. 5 illustrates a flowchart of a method for shape or mask encoding of the present invention.

FIG. 5 illustrates a flowchart of a method 500 for shape or object mask encoding of the present invention. FIGS. 3 and 4 illustrate block diagrams of the wavelet decomposition structure of the present invention in providing scalabilities of shape coding and texture coding for luminance and chrominance in arbitrarily-shaped image and video coding and decoding.

The method 500 starts in step 505 and proceeds to step 510 where a series of different or same subband (e.g., wavelet) filters $T_1, T_2, \ldots, T_N$ are applied to the luminance plane of the input image to obtain N-levels of subband decomposition for both texture $410_1$–$410_{N+1}$ and shape $420_1$–$420_{N+1}$ for the luminance component. For the purpose of claim interpretation, filter $T_1$ correlates to a "first filter" or filtering function, $T_N$ correlates to an "N filter" or filtering function, and so on.

It should be noted that subband filtering comprises two distinct processing steps: spatial filtering and subsampling. In the present invention as shown in FIGS. 3 and 4, "T" without the "( )" represents subband filtering with both filtering and subsampling. However, "(T)" with the "( )" represents only the corresponding subsampling step of a subband filter "T".

In step 520, method 500 applies the corresponding subsampling filter (T1) to the full resolution luminance shape or object mask $420_1$ to obtain a full resolution chrominance shape or object mask $430_1$. Namely, for chrominance planes (U and V), the full resolution chrominance shape is first obtained by using a subsampling filter (odd symmetric or even symmetric filter) corresponding to the subband or wavelet filter $T_1$ from the luminance shape. In turn, the corresponding series of subsampling filters ((T2), ... (TN)) can be applied to the full resolution chrominance shape information $430_1$ to obtain additional levels of chrominance shape information $430_2$–$430_N$.

It should be noted that the following description uses a color image of format YUV 4:2:0 as an example to describe the proposed method. Specifically, in a color image with YUV 4:2:0 format, every 2×2-pixel block of luminance (Y) corresponds to one pixel of U and V (chroma). However, it should be understood that a similar method can be derived from this description to be adapted to other color formats and video objects.

In step 530, method 500 applies the corresponding series of subband or wavelet filters, T2, ... TN, and said plurality of levels of chrominance shape information to the full resolution chrominance texture information $440_1$ to obtain a plurality of levels of chrominance texture information $440_2$–$440_N$. Namely, a series of N−1 wavelet transforms with wavelet filters, $T_2, \ldots, T_N$, are applied to the chrominance texture information with the above obtained chrominance shape. Namely, the key aspect is to ensure that the shape of the chrominance can be derived from the shape of the luminance at the same spatial layer.

In step 540, method 500 encodes the plurality of levels of resolution of luminance texture and shape information into the bitstream 450. However, only the plurality of levels of resolution of chrominance texture information are encoded into the bitstream. Namely, coding efficiency is enhanced by not having to encode the plurality of levels of resolution of chrominance shape information into the bitstream, while still providing the desirable feature of scalability. Method 500 then ends in step 550.

As a result of the above encoding method, within bitstream 350 the DC layer of texture for both luminance $310_{N+1}$ and chrominance $340_N$ at the decoder end have the same shape. Thus, texture information for both luminance and chrominance can be decoded correctly with only the DC layer $320_{N+1}$ of the luminance shape information. Higher layers of luminance texture information $310_N$–$310_1$ can be decoded correctly as higher layers of shape information $320_N$–$320_1$ are decoded. Thus, a higher layer of chrominance shape 330 is derived directly from the luminance shape 320 at the same spatial layer using the corresponding subsampling filters $((T_{N-1}), \ldots, (T_1))$. With these correctly derived shapes, the chrominance components can then be correctly decoded.

Figure 6:
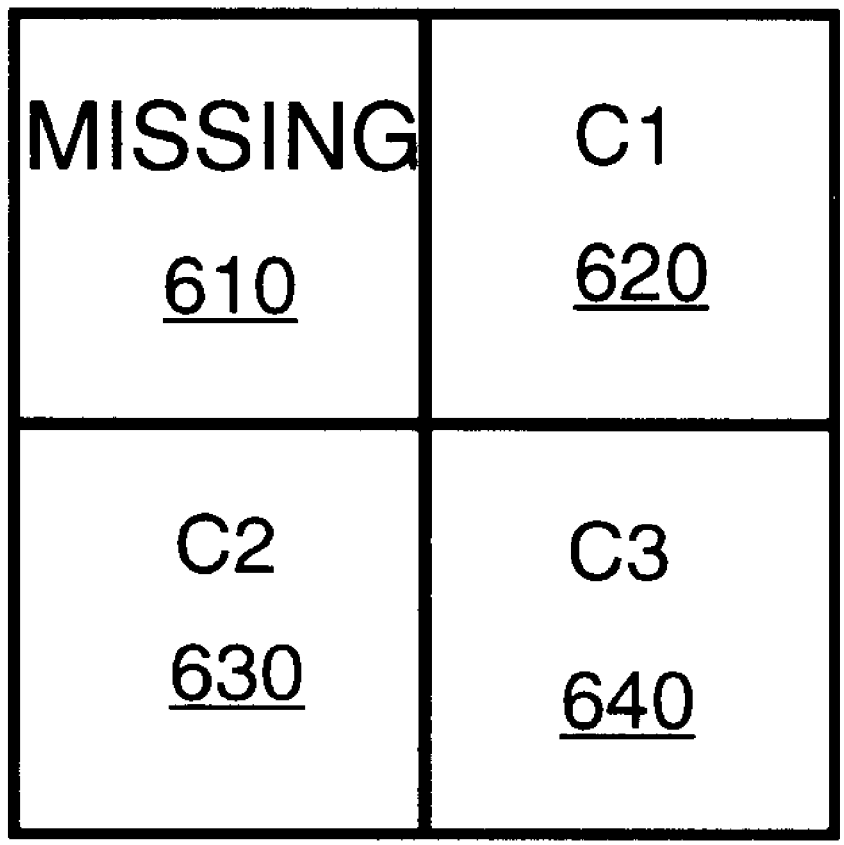
FIG. 6 illustrates a block diagram of the relative positions of chrominance values around a missing chrominance value in the chrominance plane.

FIG. 6 illustrates a block diagram of the relative positions of chrominance values around a missing chrominance value in any resolution of the chrominance component 600. It should be noted that because of the nature of the subsampling filters, at the leading boundary of a chrominance shape, there might be missing chrominance values in the corresponding chrominance texture for a pixel whose luminance is in the shape of the object mask. For example, the missing chrominance value 610 can be interpolated by taking the average of its three neighboring chrominance values 620–640 in the chrominance plane, (i.e. the chrominance value C1 to its right, the chrominance value C2 below the missing chrominance value and the chrominance value C3 to its lower-right corner). In case any of the three neighboring chrominance values is outside a shape, it will not be counted in the average. The shape-adaptive wavelet transforms guarantee that there is at least one of the three neighboring chrominance values in the shape.

Although various embodiments which incorporate the teachings of the present invention have been shown and described in detail herein, those skilled in the art can readily devise many other varied embodiments that still incorporate these teachings.

What is claimed is:

1. A method for coding an input image having luminance and chrominance texture information and luminance and chrominance shape information, said method comprising the steps of:

(a) applying a plurality of subband filtering functions to the input image to obtain a plurality of levels of luminance texture, said plurality of subband filtering functions having a first filtering function to N filtering function;

(b) applying a plurality of subsampling functions corresponding to said plurality of subband filtering functions to the input image to obtain a plurality of levels of luminance shape information;

(c) applying a corresponding first subsampling function of said plurality of subsampling functions to a full resolution luminance shape information from said plurality of luminance shape information to obtain a full resolution chrominance shape information;

(d) applying said corresponding second through N subband filtering functions to the chrominance texture information to obtain a plurality of levels of chrominance texture information; and (e) encoding said plurality of levels of luminance texture and shape information and said plurality of levels of chrominance texture information into a bitstream.

2. The method of claim 1, wherein said applying step (c) applies a corresponding first subsampling function that is an odd symmetric filtering function.

3. The method of claim 1, wherein said applying step (c) applies a corresponding first subsampling function that is an even symmetric filtering function.

4. The method of claim 1, wherein said applying step (a) applies a plurality of identical subband filtering functions to obtain said plurality of levels of luminance texture information.

5. The method of claim 1, wherein said applying step (a) applies a plurality of different subband filtering functions to obtain said plurality of levels of luminance texture information.

6. The method of claim 1, further comprising the step of:
interpolating a missing chrominance value within one of said plurality of levels of chrominance texture information, by taking an average of three neighboring chrominance values.

7. A method for decoding a bitstream representative of an input image having luminance and chrominance texture information and luminance shape information, said method comprising the steps of:

(a) applying at least one of a plurality of inverse subband filtering functions to the bitstream to obtain at least one of a plurality of levels of luminance texture information, said plurality of inverse subband filtering functions having a first inverse filtering function to N inverse filtering function;

(b) applying at least one of a plurality of corresponding inverse subsampling functions to the bitstream to obtain at least one of a plurality of levels of luminance shape information;

(c) applying at least one of a plurality of corresponding inverse subsampling functions to one of said plurality of levels of luminance shape information to obtain a corresponding chrominance shape information at a similar spatial level;

(d) applying said corresponding chrominance shape information at a similar spatial level to assist decoding a chrominance texture information at a similar spatial level; and (e) decoding at least one of said luminance and chrominance texture information at a similar spatial level to obtain a scaled version of the input image.

8. The method of claim 7, wherein said applying step (c) applies one of said corresponding plurality of inverse subsampling functions that is an odd symmetric filtering function.

9. The method of claim 7, wherein said applying step (c) applies one of said corresponding plurality of inverse subsampling functions that is an even symmetric filtering function.

10. The method of claim 7, wherein said applying step (a) applies one of said corresponding plurality of identical inverse subband filtering functions to obtain said plurality of levels of luminance texture information.

11. The method of claim 7, wherein said applying step (a) applies one of said corresponding plurality of different inverse subband filtering functions to obtain said plurality of levels of luminance texture information.

12. A computer-readable medium having stored thereon a plurality of instructions, the plurality of instructions including instructions which, when executed by a processor, cause the processor to perform the steps comprising of:
(a) applying a plurality of subband filtering functions to the input image to obtain a plurality of levels of luminance texture, said plurality of subband filtering functions having a first filtering function to N filtering function;
(b) applying a plurality of subsampling functions corresponding to said plurality of subband filtering functions to the input image to obtain a plurality of levels of luminance shape information;
(c) applying a corresponding first subsampling function of said plurality of subsampling functions to a full resolution luminance shape information from said plurality of luminance shape information to obtain a full resolution chrominance shape information;
(d) applying said corresponding second through N subband filtering functions to the chrominance texture information to obtain a plurality of levels of chrominance texture information; and
(e) encoding said plurality of levels of luminance texture and shape information and said plurality of levels of chrominance texture information into a bitstream.

13. The computer-readable medium of claim 12, wherein said applying step (c) applies a corresponding first subsampling function that is an odd symmetric filtering function.

14. The computer-readable medium of claim 12, wherein said applying step (c) applies a corresponding first subsampling function that is an even symmetric filtering function.

15. The computer-readable medium of claim 12, wherein said applying step (a) applies a plurality of identical subband filtering functions to obtain said plurality of levels of luminance texture information.

16. The computer-readable medium of claim 12, wherein said applying step (a) applies a plurality of different subband filtering functions to obtain said plurality of levels of luminance texture information.

17. The computer-readable medium of claim 12, further comprising the step of: interpolating a missing chrominance value within one of said plurality of levels of chrominance texture information, by taking an average of three neighboring chrominance values.

18. A computer-readable medium having stored thereon a plurality of instructions, the plurality of instructions including instructions which, hen executed by a processor, cause the processor to perform the steps comprising of:
(a) applying at least one of a plurality of inverse subband filtering functions to the bitstream to obtain at least one of a plurality of levels of luminance texture information, said plurality of inverse subband filtering functions having a first inverse filtering function to N inverse filtering function;
(b) applying at least one of a plurality of corresponding inverse subsampling functions to the bitstream to obtain at least one of a plurality of levels of luminance shape information;
(c) applying at least one of a plurality of corresponding inverse subsampling functions to one of said plurality of levels of luminance shape information to obtain a corresponding chrominance shape information at a similar spatial level;
(d) applying said corresponding chrominance shape information at a similar spatial level to assist decoding a chrominance texture information at a similar spatial level; and
(e) decoding at least one of said luminance and chrominance texture information at a similar spatial level to obtain a scaled version of the input image.

19. The computer-readable medium of claim 18, wherein said applying step (c) applies one of said corresponding plurality of inverse subsampling functions that is an odd symmetric filtering function.

20. The computer-readable medium of claim 18, wherein said applying step (c) applies one of said corresponding plurality of inverse subsampling functions that is an even symmetric filtering function.

* * * * *